United States Patent
Nedachi et al.

(10) Patent No.: US 8,046,141 B2
(45) Date of Patent: Oct. 25, 2011

(54) AUTOMATIC GEAR SHIFTING CONTROL DEVICE OF VEHICLE

(75) Inventors: Yoshiaki Nedachi, Saitama (JP);
Takashi Ozeki, Saitama (JP); Yoshiaki Tsukada, Saitama (JP); Hiroyuki Kojima, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/200,555

(22) Filed: Aug. 28, 2008

(65) Prior Publication Data
US 2009/0062994 A1 Mar. 5, 2009

(30) Foreign Application Priority Data
Aug. 31, 2007 (JP) .................. 2007-226546

(51) Int. Cl.
*G06F 7/00* (2006.01)
*G06F 17/00* (2006.01)
(52) U.S. Cl. .......... 701/51; 701/53; 701/54; 701/55; 701/71
(58) Field of Classification Search .......... 701/53, 701/54, 55, 71, 51; 477/92, 94
See application file for complete search history.

(56) References Cited

U.S. PATENT DOCUMENTS

| | | | | |
|---|---|---|---|---|
| 4,984,161 A | * | 1/1991 | Nakazawa et al. | 701/55 |
| 5,586,953 A | * | 12/1996 | Abo | 477/47 |
| 5,631,829 A | * | 5/1997 | Takasaki et al. | 701/69 |
| 6,023,649 A | * | 2/2000 | Matsuura et al. | 701/71 |
| 6,260,934 B1 | * | 7/2001 | Lee | 303/192 |
| 7,101,311 B2 | * | 9/2006 | Deguchi | 477/98 |
| 7,693,639 B2 | * | 4/2010 | Suzuki et al. | 701/71 |
| 7,920,952 B2 | * | 4/2011 | Miura et al. | 701/70 |
| 2003/0036837 A1 | * | 2/2003 | Katayama et al. | 701/69 |
| 2009/0064965 A1 | * | 3/2009 | Matsuda | 123/320 |

FOREIGN PATENT DOCUMENTS
JP   4-100739 A   4/1992

* cited by examiner

*Primary Examiner* — Dalena Tran
*Assistant Examiner* — Jorge Peche
(74) *Attorney, Agent, or Firm* — Birch, Stewart, Kolasch & Birch, LLP

(57) ABSTRACT

An automatic gear shifting control device of a vehicle can execute an automatic gear shifting control in response to a larger rotational speed. The automatic gear shifting control device includes a gear shifting control instruction part that executes an automatic gear shifting operation of an AMT in response to at least vehicle-speed information. First and second sensors detect rotational speed of front and rear wheels. A rotational-speed-difference detector detects the difference in rotational speed between the front and rear wheels based on information from the first and second sensors. The control part is configured to execute an automatic gear shifting control in response to the vehicle-speed information calculated based on the larger rotational speed out of the rotational speed of the front wheel and the rotational speed of the rear wheel when the difference in rotational speed is detected by the rotational-speed-difference detector.

7 Claims, 3 Drawing Sheets

AUTOMATIC GEAR SHIFTING CONTROL DEVICE OF VEHICLE

CROSS-REFERENCE TO RELATED APPLICATIONS

This nonprovisional application claims priority under 35 U.S.C. §119(a) on Patent Application No. 2007-226546, filed in Japan on Aug. 31, 2007, the entirety of which is incorporated herein by reference.

BACKGROUND OF THE INVENTION

1. Field of the Invention

The present invention relates to an automatic gear shifting control device of a vehicle. In particular, the present invention relates to an automatic gear shifting control device of a vehicle that is configured to execute, when the difference in rotational speed between a front wheel and a rear wheel is generated at the time of deceleration, an automatic gear shifting control in response to the larger rotational speed out of the rotational speed of the front wheel and the rotational speed of the rear wheel.

2. Background of the Invention

Conventionally, there has been known a constitution which mounts a rotational speed detector on a drive wheel and a driven wheel of a vehicle respectively and executes a specific control when the difference in rotational speed is generated between both wheels.

JP-A-4-100739 discloses an acceleration slip prevention device, which is configured to detect a slip state based on the difference in rotational speed between a drive wheel and a driven wheel and to execute a traction control for reducing a driving force of the drive wheel when the slip state is detected. The acceleration slip prevention device is configured to execute a low-μ-use gear shifting control in which a shift-up operation is executed earlier than a normal gear shifting control when the traction control is generated at high frequency.

In a vehicle which executes an automatic gear shifting operation of a transmission based on vehicle-speed information obtained from a rotational speed of a predetermined vehicle wheel, for example, even when only the predetermined vehicle wheel is temporarily locked, it is determined that a vehicle speed is lowered, and an automatic gear shifting operation toward a low gear side is executed. Particularly, such a phenomenon is liable to easily occur in a motorcycle or a three-wheeled vehicle which operates brake devices respectively mounted on a driven wheel and a drive wheel independently. For example, when the predetermined wheel is locked at the time of operating braking, gear shifting is automatically changed to assume a low change gear ratio compared to an actual vehicle speed, thus giving rise to a drawback in that an engine brake is applied to the drive wheel more than required.

A technique disclosed in JP-A-4-100739 is provided for changing a control of the automatic gear shifting device by detecting a slip state of a vehicle during traveling. Accordingly, in this technique, changing of a method of detecting the difference in rotational speed between a driven wheel and a drive wheel at the time of deceleration and controlling an automatic gear shifting device based on the detected difference in rotational speed has not been sufficiently studied.

SUMMARY OF THE INVENTION

It is an object of the present invention to provide an automatic gear shifting control device of a vehicle that can overcome the above-mentioned drawbacks of the background art, and which can execute, when the difference in rotational speed is generated between front and rear wheels at the time of deceleration, an automatic gear shifting control in response to the larger rotational speed out of the rotational speeds of the front and rear wheels.

To achieve the above-mentioned object, according to a first aspect of the present invention, an automatic gear shifting control device of a vehicle includes a control part that is configured to execute an automatic gear shifting operation of a transmission in response to at least vehicle-speed information. A first sensor detects a rotational speed of a front wheel, which constitutes a driven wheel. A second sensor for detecting a rotational speed of a rear wheel, which constitutes a drive wheel. A rotational-speed-difference detector is configured to a difference in rotational speed between the front wheel and the rear wheel based on information from the first sensor and information from the second sensor. The control part is configured to execute an automatic gear shifting control in response to the vehicle-speed information calculated based on the larger rotational speed out of the rotational speed of the front wheel and the rotational speed of the rear wheel when the difference in rotational speed is detected.

According to a second aspect of the present invention, the control part executes a gear shifting operation of the transmission toward a shift-up side when the difference in rotational speed is continuously detected for a predetermined time or more.

According to a third aspect of the present invention, the gear shifting operation toward the shift-up side is executed until no difference in rotational speed is detected.

According to a fourth aspect of the present invention, the control part is configured to execute an automatic gear shifting control in response to the vehicle-speed information calculated based on the larger rotational speed out of the rotational speed of the front wheel and the rotational speed of the rear wheel when the difference in rotational speed is detected at the time of deceleration of the vehicle speed.

According to a fifth aspect of the present invention, the vehicle is a motorcycle.

According to the first aspect of the present invention, the automatic gear shifting control device of the vehicle includes the control part that is configured to execute the automatic gear shifting operation of the transmission in response to at least vehicle-speed information, the first sensor that detects a rotational speed of the front wheel, which constitutes the driven wheel, the second sensor that detects a rotational speed of the rear wheel, which constitutes the drive wheel, and the rotational-speed-difference detector that is configured to detect the difference in rotational speed between the front wheel and the rear wheel based on information from the first sensor and the second sensor, and the control part executes the automatic gear shifting control in response to the vehicle-speed information calculated based on the larger rotational speed out of the rotational speed of the front wheel and the rotational speed of the rear wheel when the difference in rotational speed is detected. Accordingly, even when the difference in rotational speed is generated between the front and rear wheels at the time of accelerating or decelerating the vehicle, it is possible to execute an appropriate automatic gear shifting control which conforms to a traveling state of a vehicle. For example, in the case where the vehicle is in a decelerating state, even when one of the front wheel and the rear wheel is locked or a rotational speed of one of the front wheel and the rear wheel is sharply lowered due to a braking operation, there exists no possibility of the automatic gear shifting control toward a low-gear side (shift-down side) being executed in response to the rotational speed of the corresponding wheel. Accordingly, it is possible to prevent the generation of an engine brake more than required due to excessive lowering of a change gear ratio of the transmission compared to an actual vehicle speed, thus realizing a smooth deceleration of the vehicle speed.

According to the second aspect of the present invention, the control part executes the gear shifting operation of the transmission toward the shift-up side when the difference in rotational speed is continuously detected for a predetermined time or more. Therefore, even when a vehicle speed is gradually lowered while continuing a rear-wheel locked state due to a braking operation on a slippery road surface or the like, it is possible to prevent the transmission from being shifted toward a shift-down side corresponding to the lowering of the rotational speed of the front wheel. Accordingly, there is no possibility that an engine brake more than required is generated when a rear-wheel braking is released.

According to the third aspect of the present invention, the gear shifting operation toward the shift-up side is executed until no difference in rotational speed is detected. Therefore, the longer the continuation time of the rear-wheel locked state, the gear shifting operation toward a top-gear side advances, whereby it is possible to reduce the possibility that an engine brake more than required is generated when the rear wheel brake is released.

According to the fourth aspect of the present invention, the control part is configured to execute an automatic gear shifting control in response to the vehicle-speed information calculated based on the larger rotational speed out of the rotational speed of the front wheel and the rotational speed of the rear wheel when the difference in rotational speed is detected at the time of deceleration of the vehicle speed. Accordingly, it is possible to execute an appropriate automatic gear shifting control that conforms to a traveling state of the vehicle when the difference in rotational speed between the front and rear wheels is generated due to the braking operation.

According to the fifth aspect of the present invention, the vehicle is a motorcycle. Therefore, it is possible to apply the gear shifting control device which can execute an appropriate automatic gear shifting operation even when sudden braking is applied to a motorcycle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
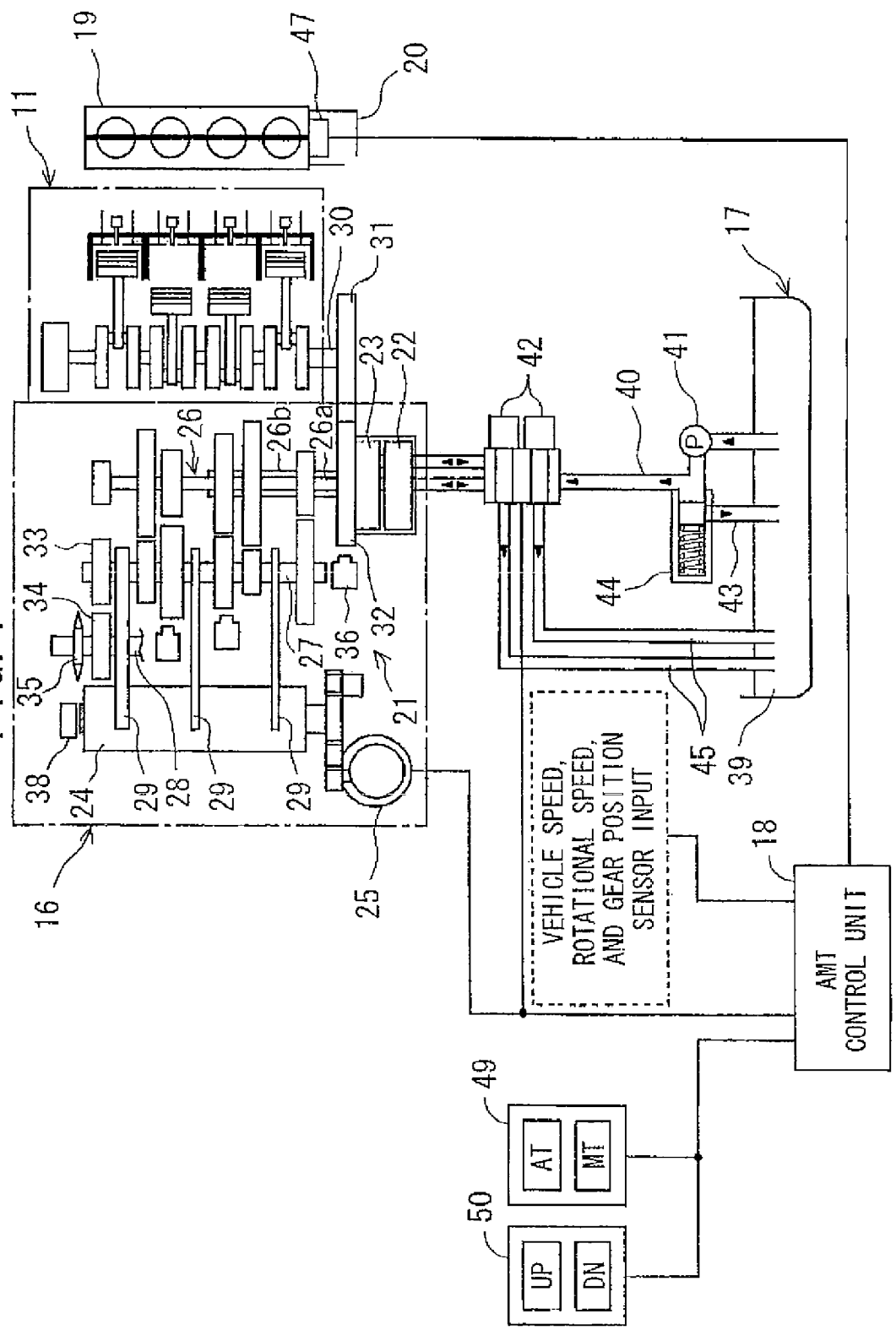
FIG. 1 is a system constitutional view of an automatic manual transmission according to one embodiment of the present invention and devices around the automatic manual transmission.

The present invention will now be described in detail with reference to the accompanying drawings, wherein the same reference numerals will be used to identify the same or similar elements throughout the several views. It should be noted that the drawings should be viewed in the direction of orientation of the reference numerals.

Hereinafter, a preferred embodiment of the present invention is explained in detail in conjunction with drawings. FIG. 1 is a system constitutional view of an automatic manual transmission (hereinafter, referred to as an AMT), which constitutes an automatic transmission applied to a motorcycle and devices around the AMT. The driving of the AMT 16 connected to an engine 11 is controlled by a clutch-use hydraulic device 17 and an AMT control unit 18. The engine 11 includes a throttle-by-wire (TBW) type throttle body 19. The throttle body 19 includes a motor 20 for opening and closing the throttle.

The AMT 16 includes a multi-stage transmission gear 21, a first clutch 22, a second clutch 23, a shift drum 24, and a shift control motor 25 for rotating the shift drum 24. A large number of gears constituting the transmission gear 21 are respectively joined to or loosely fitted on a main shaft 26, a counter shaft 27 and a speed-change gear output shaft 28. The main shaft 26 is constituted of an inner main shaft 26a and an outer main shaft 26b. The inner main shaft 26a is joined to the first clutch 22. The outer main shaft 26b is joined to the second clutch 23. A clutch (not shown in the drawing), which is displaceable in the axial direction of the main shaft 26, is mounted on the main shaft 26, while a clutch (not shown in the drawing), which is displaceable in the axial direction of the counter shaft 27, is mounted on the counter shaft 27. End portions of shift forks 29 are respectively engaged with cam shafts (not shown in the drawing) formed on the clutches and the shift drum 24.

A primary drive gear 31 is joined to the output shaft of the engine 11, i.e. to a crankshaft 30. The primary drive gear 31 is meshed with a primary driven gear 32. The primary driven gear 32 is joined to the inner main shaft 26a by way of the first clutch 22 and, at the same time, is joined to an outer main shaft 26b by way of the second clutch 23.

A counter shaft output gear 33, which is joined to the counter shaft 27, is meshed with an output driven gear 34 joined to the speed-change gear output shaft 28. A drive sprocket wheel 35 is joined to the speed-change gear output shaft 28. A driving force is transmitted to a rear wheel WR (see FIG. 2), which constitutes a drive wheel by way of a drive chain (not shown in the drawing) wound around the drive sprocket wheel 35. Furthermore, in the inside of the AMT 16, an engine rotational speed sensor 36 arranged to face an outer periphery of the primary driven gear 32 in an opposed manner and a gear position sensor 38 for detecting a present gear stage position based on a rotational position of the shift drum 24 are arranged. Furthermore, on the throttle body 19, a throttle sensor 47 which outputs a throttle opening signal is mounted.

The clutch-use hydraulic device 17 includes an oil tank 39 and a pipe passage 40 for feeding oil stored in the oil tank 39 to the first clutch 22 and the second clutch 23. A pump 41 and a valve 42 are mounted on the pipe passage 40. A regulator 44 is arranged on a return pipe passage 43 connected to the pipe passage 40. The valve 42 is configured to apply oil pressure to the first clutch 22 and the second clutch 23 individually.

Furthermore, a return pipe passage 45 for returning oil is also provided to the valve 42.

A mode switch 49 for changing over an operation of the AMT control unit 18 between an automatic transmission (AT) mode and a manual transmission (MT) mode, and a shift select switch 50 which instructs the AMT control unit 18 to perform a shift-up (UP) operation or a shift-down (DN) operation are connected to the AMT control unit 18. The AMT control unit 18 includes a microcomputer (CPU), and is configured to automatically or semi-automatically change over a gear stage position of the AMT 16 by controlling the valve 42 and the shift control motor 25 in response to output signals of the respective sensors and switches.

The AMT control unit 18 automatically changes over the transmission gear 21 in response to information such as a vehicle speed, an engine rotational speed, and throttle opening when the AT mode is selected. On the other hand, when the MT mode is selected, the AMT control unit 18 performs the shift-up or shift-down operation of the transmission gear 21 in accordance with the gear shifting operation of the select switch 50. Also when the MT mode is selected, the AMT control unit 18 may be configured to execute an auxiliary automatic gear shifting control for preventing the excessive rotation or the stall of the engine.

In the clutch-use hydraulic device 17, oil pressure is applied to the valve 42 by the pump 41, and the oil pressure is controlled by the regulator 44 for preventing the oil pressure from exceeding an upper limit value. When the valve 42 is opened based on an instruction from the AMT control unit 18, the oil pressure is applied to the first clutch 22 or the second clutch 23 so that the primary driven gear 32 is joined to the inner main shaft 26a or the outer main shaft 26b by way of the first clutch 22 or the second clutch 23. Furthermore, when the valve 42 is closed and the application of the oil pressure is stopped, the first clutch 22 and the second clutch 23 are biased in the direction which disconnects the engagement between the primary driven gear 32 and the inner main shaft 26a or the outer main shaft 26b due to a return spring (not shown in the drawing) incorporated in the first clutch 22 and the second clutch 23.

The shift control motor 25 rotates the shift drum 24 in accordance with the instruction from the AMT control unit 18. When the shift drum 24 is rotated, the shift fork 29 is displaced in the axial direction of the shift drum 24 along a shape of a cam groove formed in an outer periphery of the shift drum 24 so as to move the clutch. Due to the movement of the clutch, the meshing of the gears on the counter shaft 27 with the gears on the main shaft 26 is changed. Hence, the transmission gear 21 is shifted up or down.

Figure 2:
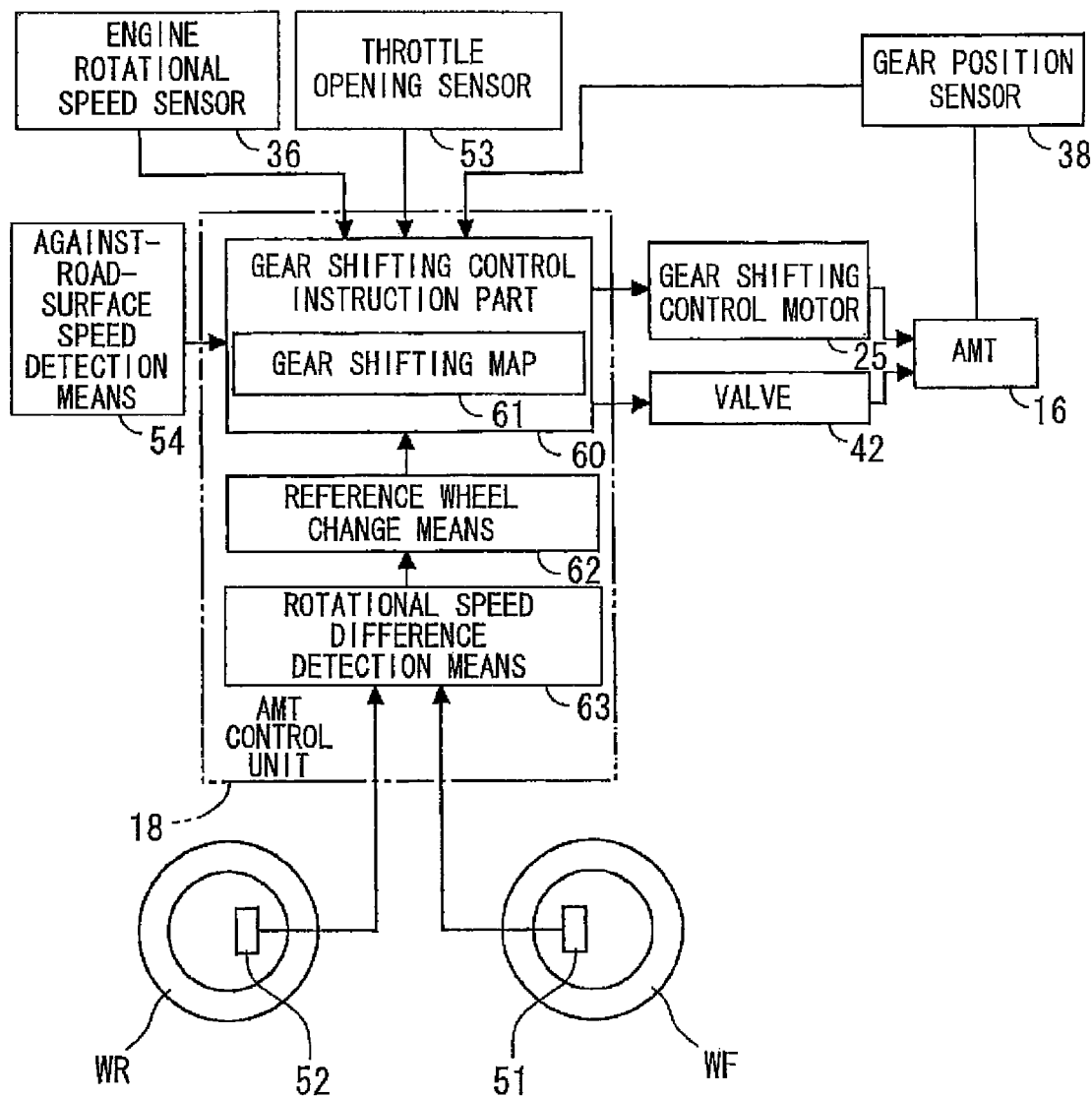
FIG. 2 is a block diagram showing the constitution of an AMT control unlit according to one embodiment of the present invention and devices around the AMT control unit.

FIG. 2 is a block diagram showing the construction of the AMT control unit according to one embodiment of the present invention and devices around the AMT control unit. In FIG. 2, parts identical with the parts shown in FIG. 1 are given the same symbols. The AMT control unit 18 includes a gear shifting control instruction part 60, which stores a gear shifting map 61 therein, a reference wheel change means 62, and a rotational speed difference detection means 63. The gear shifting control instruction part 60, which constitutes a control part, is configured to drive the shift control motor 25 and the valve 42 in accordance with the gear shifting map 61 formed of a three-dimensional map based on an output signal of the engine rotational speed sensor 36, an output signal of the throttle opening sensor 53, an output signal of the gear position sensor 38 and the vehicle-speed information described later.

The automatic gear shifting control device of the vehicle according to this embodiment includes a first sensor 51 for detecting a rotational speed of the front wheel WF, which constitutes a driven wheel and a second sensor 52 for detecting a rotational speed of the rear wheel WR, which constitutes a drive wheel. The automatic gear shifting control device is configured to detect the difference in rotational speed between the front wheel WF and the rear wheel WR using the rotational-speed difference detection means 63. The detection of vehicle speed during normal traveling may be performed using either one of the first sensor 51 and the second sensor 52, to consider the difference between an outer diameter of the front wheel WF and an outer diameter of the rear wheel WR.

When a braking force is suddenly applied to the motorcycle, which includes brake devices that respectively independently act on the front wheel WF and the rear wheel WR, there exists a possibility that the rear wheel WR, from which the load is easily removed, is locked due to a loss of a gripping force between the rear wheel WR and the road surface, or the rear wheel WR assumes the low rotational speed compared to an actual vehicle speed, even when the rear wheel WR does not reach a locked state. In this case, for example, when the automatic gear shifting control device is configured to acquire vehicle speed information, which becomes the reference of the gear shifting control only from the second sensor 52, the automatic gear shifting control toward a low-gear side is sequentially executed corresponding to the lowering of the rotational speed of the rear wheel WR. In this manner, when the automatic gear shifting is executed corresponding to a temporary locking of the rear wheel WR, a low change gear ratio is selected compared to an actual vehicle speed. Hence, there exists a possibility that an engine brake more than required is generated even when the braking force applied to the rear wheel WR is released, whereby a locked state of the rear wheel WR continues. In the automatic gear shifting control device of the vehicle according to this embodiment, the rotational speeds of the front and rear wheels are respectively detected, and when the difference in rotational speed is generated between the front and rear wheels, the automatic gear shifting control device executes the automatic gear shifting based on the vehicle speed information detected from the larger rotational speed.

The rotational-speed-difference detection means 63 calculates the difference in rotational speed between the front wheel WF and the rear wheel WR by comparing information obtained by the first sensor 51, which detects the rotational speed of the front wheel WF and is used as a driven wheel and information obtained by the second sensor 52, which detects the rotational speed of the rear wheel WR and is used as a drive wheel. Furthermore, when the difference in rotational speed is detected between the front and rear wheels, an instruction for executing the automatic gear shifting in response to the larger rotational speed is transmitted to the gear shifting control instruction part 60 by the reference wheel change means 62. A value of the difference in rotational speed, which allows the reference wheel change means 62 to output the changing instruction, may be set in conformity with the vehicle-body construction or the like or may be increased or decreased in response to the value of the larger rotational speed. Furthermore, a predetermined waiting time (for example, 1 second) may be set during a period from a point of time that the predetermined difference in rotational speed is detected to a point of time that the reference vehicle wheel is changed. A ground-to face speed detection means 54, which inputs an output signal to the gear shifting control instruction part 60, will be described later.

Figure 3:
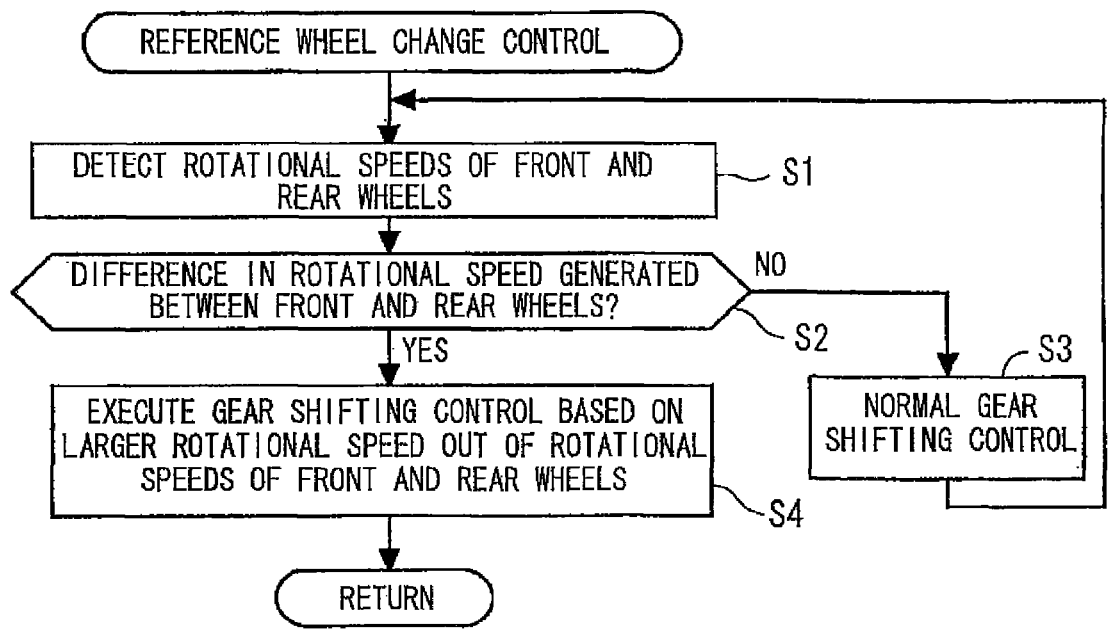
FIG. 3 is a flowchart showing a flow of a reference wheel change control according to the present invention.

FIG. 3 is a flowchart showing a flow of a reference wheel change control according to this embodiment. When the rotational speeds of the front and rear wheels are respectively detected by the first sensor 51 and the second sensor 52 in step S1, it is determined whether or not the difference in rotational speed is generated between the front and rear wheels by the rotational-speed-difference detection means 63 in step S2. A value of the difference in rotational speed used in this determination may be set to a value of 5 km/h when expressed as a vehicle speed, for example. When the determination in step S2 is affirmative, the processing advances to step S4, and the reference wheel change means 62 instructs the gear shifting control instruction part 60 to execute the gear shifting control in response to the larger rotational speed out of the rotational speeds of the front and rear wheels. In this manner, a series of reference wheel change control is finished. On the other hand, when the determination in step S2 is negative, a normal gear shifting control is continued in step S3, and the processing returns to step S1.

The first sensor 51 and the second sensor 52 may preferably be formed of a non-contact sensor that can measure a passing interval of a pickup portion mounted on the vehicle wheel using a Hall element or the like. Furthermore, the rotational speed of the rear wheel WR may be calculated by a sensor (not shown in the drawing) which detects a rotational speed of the shift gear in the inside of the AMT 16 or the like in place of the second sensor 52.

Figure 4:
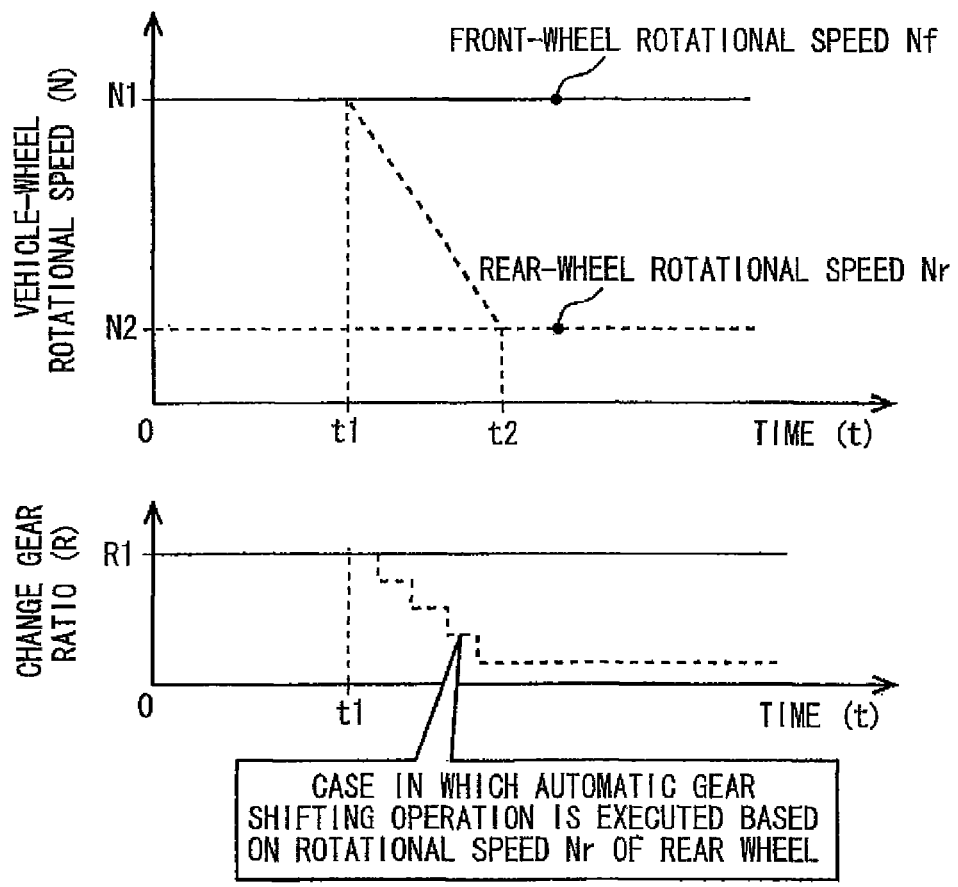
FIG. 4 is a graph showing one example of the transition of rotational speeds of front and rear wheels at the time of deceleration.

FIG. 4 is a graph showing one example of the transition of the rotational speeds of the front and rear wheels at the time of deceleration. In this embodiment, a rear wheel brake is operated at a point of time t1 during steady-state traveling during which both the front wheel WF and the rear wheel WR are rotated with a rotational speed N1. Only the rotational speed Nr of the rear wheel WR is sharply lowered simultaneously with the operation of the rear wheel brake. For the sake of brevity, FIG. 4 shows a state in which the front wheel WF is continuously rotated with a rotational speed N1 without decelerating the vehicle speed even when the rear wheel brake is operated. On the other hand, the rear wheel WR loses a gripping force with a road surface and slips on the road surface so that the rotational speed of the rear wheel WR is decelerated at predetermined deceleration until the rotational speed reaches a rotational speed N2 at a point of time t2.

When the automatic gear shifting operation device is configured to execute the automatic gear shifting of the AMT 16 only based on the rotational speed Nr of the rear wheel WR, corresponding to the decrease of the rotational speed Nr, the automatic gear shifting operation is sequentially executed toward the low-gear side from a change gear ratio R1. Accordingly, even when the rear wheel braking is released, an actual vehicle speed is not lowered. Hence, there exists a possibility that a locked state of the rear wheel WR continues due to an engine brake generated on the rear wheel WR. To the contrary, according to the automatic gear shifting control device of the vehicle of this embodiment, when only the rotational speed Nr of the rear wheel WR is lowered and the difference in rotational speed is generated between the front and rear wheels, the automatic gear shifting control is executed based on the rotational speed Nf of the front wheel WF. Hence, the gear shifting control, which conforms to an actual vehicle speed, is executed, thus realizing the smooth deceleration of the vehicle speed. On the other hand, when the front wheel WF is locked or the rotational speed of the front wheel WF is lowered, the gear shifting control is executed based on the rotational speed Nr of the rear wheel WR.

The gear shifting control may be set such that the gear shifting is executed forcibly toward a shift-up side when the difference in rotational speed between the front wheel and the rear wheel is detected continuously for a preset time (for example, 3 seconds) or more. In this case, for example, at the time of deceleration on a slippery road surface or the like, even when the vehicle speed is gradually lowered while a locked state of the rear wheel WR by a braking operation continues, it is possible to prevent a phenomenon that the gear shifting is executed toward the shift-down side corresponding to the lowering of the rotational speed of the front wheel WF, whereby there is no possibility that an engine brake more than required is generated when the rear-wheel braking is released. Furthermore, the gear shifting control may be set such that the gear shifting toward the shift-up side is executed until the difference in rotational speed between the front wheel and the rear wheel is no more detected. In this case, the longer the continuation time of the locked state of the rear wheel, the gear shifting advances toward the top gear side. Hence, it is possible to lower the possibility that an engine brake more than required is generated when the rear-wheel braking is released.

Furthermore, in place of the above-mentioned automatic gear shifting control device, when locking or the like is generated on both of front and rear wheels, the gear shifting control can be also executed based on an against-road-surface speed of the vehicle body. Accordingly, the information from the against-road-surface speed detection means 54, which directly measures the against-road-surface speed, is inputted to the gear shifting control instruction part 60 shown in FIG. 2. In the above-mentioned gear shifting control device, when the locking of the rear wheel WR or the like occurs, the reference wheel for the vehicle speed detection may be changed over to the front wheel WF. However, when the front wheel WF is also simultaneously locked or the rotational speed of the front wheel WF is lowered, there exists possibility that an actual vehicle speed cannot be detected. In such a case, when the automatic gear shifting control device is in an environment where the against-road-surface speed can be detected by the against-road-surface speed detection means 54, the appropriate gear shifting control can be executed using the against-road-surface speed as the vehicle speed. In this manner, by simultaneously locking the front and rear wheels temporarily, it is possible to prevent the change gear ratio from being excessively lowered compared to the actual vehicle speed. The against-road-surface speed detection means 54 may be formed of an air speed meter of a traveling wind, a GPS device or the like besides a photo sensor which detects a predetermined pick-up part arranged on a road surface. Furthermore, in executing only the above-mentioned control of changing over the reference wheel, the against-road-surface speed detection means 54 may not be necessary.

As described above, according to the gear shifting control device of the motorcycle of the present invention, the rotational speed detection means is provided to the front and rear wheels respectively. When the difference in rotational speed between the front and rear wheels is detected, the control part executes the automatic gear shifting control in response to the vehicle-speed information calculated based on the larger rotational speed out of the rotational speed of the front wheel and the rotational speed of the rear wheel. Hence, it is possible to execute the appropriate gear shifting control corresponding to the actual vehicle speed even when the wheel from which the vehicle speed is detected is locked or the rotational speed of the vehicle is sharply lowered by a braking operation.

The value of the difference in rotational speed between the front wheel and the rear wheel for executing the change control of the reference wheel, a waiting time until the change control is executed after the detection of the difference in rotational speed and the like are not limited to the above-mentioned values in the above-mentioned embodiment and can assume various values. For example, as the change condition of the reference wheel, it may be possible to add a condition that the rotational speed of the wheel from which the vehicle speed is detected becomes a predetermined value (for example, 20 km/h when expressed as vehicle speed) or more or the like. Furthermore, the automatic transmission may be constituted of a V-belt-type continuously variable transmission which drives a shift pulley using an actuator. Still further, the above-mentioned gear shifting control device is applicable to a four-wheeled vehicle that includes two drive wheels and two driven wheels, a three-wheeled vehicle that includes two rear wheels, which constitute drive wheels or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic gear shifting control device of a vehicle, comprising:
    a control part that is configured to execute an automatic gear shifting operation of a transmission in response to at least vehicle speed;
    a first sensor that detects a rotational speed of a front wheel which constitutes a driven wheel;
    a second sensor that detects a rotational speed of a rear wheel, which constitutes a driven wheel; and
    a rotational-speed-difference detector that is configured to detect a difference in rotational speed between the front wheel and the rear wheel based on information from the first sensor and information from the second sensor,
    wherein the control part is configured to execute an automatic gear shifting control in response to the vehicle speed, the vehicle speed calculated based on the rotational speed of the front wheel when the front wheel has a greater rotational speed than the rear wheel and calculated based on the rotational speed of the rear wheel when the rear wheel has a greater rotational speed than the front wheel,
    wherein when the rotational speed of the rear wheel decreases to create a difference in rotational speed between the front and rear wheels, the automatic gear shifting control is executed toward a lower gear side from a change gear ratio on the rotational speed of the front wheel,
    wherein when the front wheel is locked or the rotational speed of the front wheel is lower than the rear wheel, the gear shifting control is executed toward the lower gear side from the change gear ratio on the rotational speed of the rear wheel, and
    wherein a gear shift toward a shift up side is executed until a difference in rotational speed between the front wheel and the rear wheel is no longer detected.

2. The automatic gear shifting control device of a vehicle according to claim 1, wherein the control part executes a gear shifting operation of the transmission toward a shift-up side when the difference in rotational speed is continuously detected for a predetermined time or more.

3. The automatic gear shifting control device of a vehicle according to claim 1, wherein the control part is configured to execute an automatic gear shifting control in response to the vehicle-speed information calculated based on the larger rotational speed out of the rotational speed of the front wheel and the rotational speed of the rear wheel when the difference in rotational speed is detected at the time of deceleration of the vehicle speed.

4. An automatic gear shifting control device of a vehicle, comprising:
    a control part that is configured to execute an automatic gear shifting operation of a transmission in response to at least vehicle speed;
    a first sensor that detects a rotational speed of a front wheel, which constitutes a driven wheel;
    a second sensor that detects a rotational speed of a rear wheel, which constitutes a drive wheel;
    a vehicle speed detector that detects the speed of the vehicle; and
    a rotational-speed-difference detector that is configured to detect a difference in rotational speed between the front wheel and the rear wheel based on information from the first sensor and information from the second sensor,
    wherein the control part is configured to execute an automatic gear shifting control in response to the vehicle speed, the vehicle speed based on the rotational speed of the front wheel when the front wheel has a greater rotational speed than the rear wheel and based on the rotational speed of the rear wheel when the rear wheel has a greater rotational speed than the front wheel or based on the speed of the vehicle detected by the vehicle speed detector,
    wherein when the rotational speed of the rear wheel decreases to create a difference in rotational speed between the front and rear wheels, the automatic gear shifting control is executed toward a lower gear side from a change gear ratio on the rotational speed of the front wheel,
    wherein when the front wheel is locked or the rotational speed of the front wheel is lower than the rear wheel, the gear shifting control is executed toward the lower gear side from the change gear ratio on the rotational speed of the rear wheel, and
    wherein a gear shift toward a shift up side is executed until a difference in rotational speed between the front wheel and the rear wheel is no longer detected.

5. The automatic gear shifting control device of a vehicle according to claim 4, wherein the control part executes a gear shifting operation of the transmission toward a shift-up side when the difference in rotational speed is continuously detected for a predetermined time or more.

6. The automatic gear shifting control device of a vehicle according to claim 4, wherein the control part is configured to execute an automatic gear shifting control in response to the vehicle-speed information calculated based on the larger rotational speed out of the rotational speed of the front wheel and the rotational speed of the rear wheel when the difference in rotational speed is detected at the time of deceleration of the vehicle speed.

7. An automatic gear shifting control device of a vehicle, comprising:
    a first sensor that detects a rotational speed of a front wheel which constitutes a driven wheel;
    a second sensor that detects a rotational speed of a rear wheel which constitutes a drive wheel; and
    a rotational-speed-difference detector that is configured to detect a difference in rotational speed between the front wheel and the rear wheel based on information from the first sensor and information from the second sensor,
    a control part configured to determine a larger rotational speed out of the rotational speed of the front wheel and the rotational speed of the rear wheel when the difference in rotational speed between the front wheel and the rear wheel is detected, calculating a vehicle speed from the front wheel when the front wheel has a greater rotational speed than the rear wheel and calculating the vehicle speed from the rear wheel when the rear wheel has a greater rotational speed than the front wheel and executing an automatic gear shifting operation of a transmission based on the calculated vehicle speed, wherein when the rotational speed of the rear wheel decreases to create a difference in rotational speed between the front and rear wheels, the automatic gear shifting control is executed toward a lower gear side from a change gear ratio on the rotational speed of the front wheel, wherein when the front wheel is locked or the rotational speed of the front wheel is lower than the rear wheel, the gear shifting control is executed toward the lower gear side from the change gear ratio on the rotational speed of the rear wheel, and wherein a gear shift toward a shift up side is executed until a difference in rotational speed between the front wheel and the rear wheel is no longer detected.

* * * * *